(12) United States Patent
Choi et al.

(10) Patent No.: US 8,682,219 B2
(45) Date of Patent: *Mar. 25, 2014

(54) COMPACT IMAGE FORMING APPARATUS HAVING PIVOTALLY ATTACHED SCANNING UNIT

(71) Applicant: Samsung Electronics Co., Ltd., Suwon-si (KR)

(72) Inventors: Dong-ha Choi, Suwon-si (KR); Kiel-jae Hur, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/655,112

(22) Filed: Oct. 18, 2012

(65) Prior Publication Data

US 2013/0039676 A1 Feb. 14, 2013

Related U.S. Application Data

(63) Continuation of application No. 12/048,804, filed on Mar. 14, 2008, now Pat. No. 8,315,540.

(30) Foreign Application Priority Data

Apr. 16, 2007 (KR) .................. 10-2007-0037140
Apr. 16, 2007 (KR) .................. 10-2007-0037142

(51) Int. Cl.
*G03G 15/00* (2006.01)

(52) U.S. Cl.
USPC .......................................................... 399/125

(58) Field of Classification Search
USPC .......................................................... 399/125
See application file for complete search history.

(56) References Cited

U.S. PATENT DOCUMENTS

| 5,510,827 | A | 4/1996 | Kubota et al. |
| 5,561,499 | A | 10/1996 | Setoriyama |
| 7,302,221 | B2 | 11/2007 | Shyu |
| 2004/0131378 | A1 | 7/2004 | Hattori et al. |
| 2005/0220640 | A1 | 10/2005 | Finkenbinder et al. |
| 2006/0140670 | A1 | 6/2006 | Choi et al. |

FOREIGN PATENT DOCUMENTS

JP 60149055 A 8/1985

OTHER PUBLICATIONS

Office Action mailed Mar. 18, 2011 in U.S. Appl. No. 12/048,804.
Notice of Allowance mailed Oct. 27, 2011 in U.S. Appl. No. 12/048,804.
Office Action mailed Feb. 6, 2012 in U.S. Appl. No. 12/048,804.
Notice of Allowance mailed Jul. 18, 2012 in U.S. Appl. No. 12/048,804.
U.S. Appl. No. 12/048,804, filed Mar. 14, 2008, Dong-ha Choi, et al., Samsung Electronics Co., Ltd.

*Primary Examiner* — Walter L Lindsay, Jr.
*Assistant Examiner* — Barnabas Fekete
(74) *Attorney, Agent, or Firm* — Staas & Halsey LLP

(57) ABSTRACT

An image forming apparatus to be placed on a desktop includes a first body, a second body which is pivotally mounted above the first body, a light emitting unit disposed in the second body, an image forming unit disposed in the first body so as to form a C-shaped paper feeding path, a first power supply unit and a second power supply unit disposed on a bottom surface of the first body, a controlling board disposed on a first side wall of the first body, and a power transmission unit disposed on a second side wall of the first body.

19 Claims, 7 Drawing Sheets

COMPACT IMAGE FORMING APPARATUS HAVING PIVOTALLY ATTACHED SCANNING UNIT

CROSS-REFERENCE TO RELATED APPLICATION

This application is a continuation application of co-pending U.S. patent application Ser. No. 12/048,804 filed on Mar. 14, 2008, and claims the priority benefit of Korean Patent Application No. 10-2007-0037140 filed on Apr. 16, 2007 and Korean Patent Application No. 10-2007-0037142, filed on Apr. 16, 2007, in the Korean Intellectual Property Office, the disclosures of which are incorporated herein by reference.

BACKGROUND OF THE INVENTION

1. Field of the Invention

Aspects of the present invention relate to an image forming apparatus, and more particularly, to a compact image forming apparatus that can be used on a desktop.

2. Description of the Related Art

The size of an image forming apparatus, such as a printer, a copier, a multi-function apparatus, etc., is generally determined by various factors, such as the size of sheets of printing media used with the image forming apparatus. Image forming apparatuses used in offices are designed so that large capacity printing media cassettes, network printing functions, and various sizes of printing media can be used. Image forming apparatuses used in office settings have generally increased in size over time.

On the other hand, image forming apparatuses for domestic use are designed to be compact and operate at a low noise level, rather than operate at a high speed and have powerful functions, because only a small amount of printed material is printed when image forming apparatuses are used at home. Image forming apparatuses for domestic use are used less frequently than image forming apparatuses for office use.

FIG. 1 illustrates a conventional multifunction peripheral (MFP) 1 as an example of an image forming apparatus. The conventional MFP 1 includes a scanning unit and a printing unit. As illustrated in FIG. 1, the MFP includes a first body 10 in which the printing unit is mounted and a second body 20 in which the scanning unit is mounted.

The first body 10 is configured in the same manner as a conventional printer is configured. The conventional printer may be, for example, an electrophotographic type image forming apparatus or an inkjet type image forming apparatus. The first body 10 of FIG. 1, in which an electrophotographic type image forming apparatus is illustrated, includes a printing medium cassette 11, a pickup unit 12, a feeding unit 13, a developing unit 14, a transferring unit 15, a fixing unit 16, a discharging unit 17 and a light emitting unit 18.

The second body 20 includes the scanning unit. The scanning unit is disposed above the first body 10 and includes a plate 21 on which a document is placed, a charge coupled device (CCD) module 22 which is mounted on the bottom surface of the plate 21 so as to move from side to side, and a plate cover 23 which is designed to cover the plate 21.

However, the conventional MFP has been developed without taking into consideration the need for miniaturization, so the dimensions of conventional MFPs are too large for MFPs to fit on desktops. Accordingly, conventional MFPs require a space separate from a desktop to be installed on, which causes user inconvenience.

SUMMARY OF THE INVENTION

Aspects of the present invention relate to a compact image forming apparatus suitable for desktop use.

According to a first aspect of the present invention, an image forming apparatus includes a first body, a second body which is pivotally mounted above the first body, a light emitting unit disposed in the second body, an image forming unit disposed in the first body so as to form a C-shaped paper feeding path, a first power supply unit and a second power supply unit disposed on a bottom surface of the first body, a controlling board disposed on a first side wall of the first body, and a power transmission unit disposed on a second side wall of the first body.

According to an aspect of the present invention, the image forming unit disposed in the first body includes a feeding unit, a developing unit, a transferring unit, a fixing unit and a discharging unit, the first power supply unit is disposed below the developing unit, and the second power supply unit is disposed below the fixing unit.

According to an aspect of the present invention, the fixing unit is mounted in a front portion of the first body, from which a corresponding front portion of the second body rotates away from to be opened.

According to an aspect of the present invention, the controlling board is directly connected to the first power supply unit, the first power supply unit is directly connected to the second power supply unit, and the second power supply unit is directly connected to the power transmission unit.

According to an aspect of the present invention, the feeding unit houses sheets of A4 size paper and letter size paper.

According to an aspect of the present invention, the first power transmission unit includes a switching mode power supply (SMPS), and the second power supply unit includes a high voltage power supply (HVPS).

According to an aspect of the present invention, the first body includes a detection sensor to detect whether the second body is opened or closed, if the detection sensor detects that the second body is opened, the detection sensor turns off the fixing unit, and if the fixing unit is turned off, the light emitting unit is turned off by circuitry.

According to an aspect of the present invention, a fan is mounted on the first side wall, and the fan simultaneously cools the first power supply unit, the second power supply unit, and the fixing unit.

According to an aspect of the present invention, the fan outwardly discharges air inside the image forming apparatus, and the image forming apparatus further includes a shock absorbing member to reduce noise and vibration between the fan and the first side wall. According to an aspect of the present invention, the shock absorbing member is a sponge.

According to an aspect of the present invention, the first power supply unit is connected to the controlling board, the second power supply unit is connected to the power transmission unit, and the first power supply unit and the second power supply unit are connected to each other to exchange signals with each other.

According to an aspect of the present invention; the second body pivotally rotates to have a maximum opening angle of approximately 45°.

According to an aspect of the present invention, the scanning unit includes a plate on which a document is placed, a scanning module to move from side to side on the plate, the scanning module being disposed below the plate; and a plate cover which is pivotally attached to the second body by a hinge. According to an aspect of the present invention, an initial position of the scanning module is on a side opposite the hinge.

According to another aspect of the present invention, an image forming apparatus includes a first body, a second body which is pivotally mounted above the first body, a light emitting unit disposed in the second body, and an image forming unit disposed in the first body so as to form a C-shaped printing medium feeding path.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
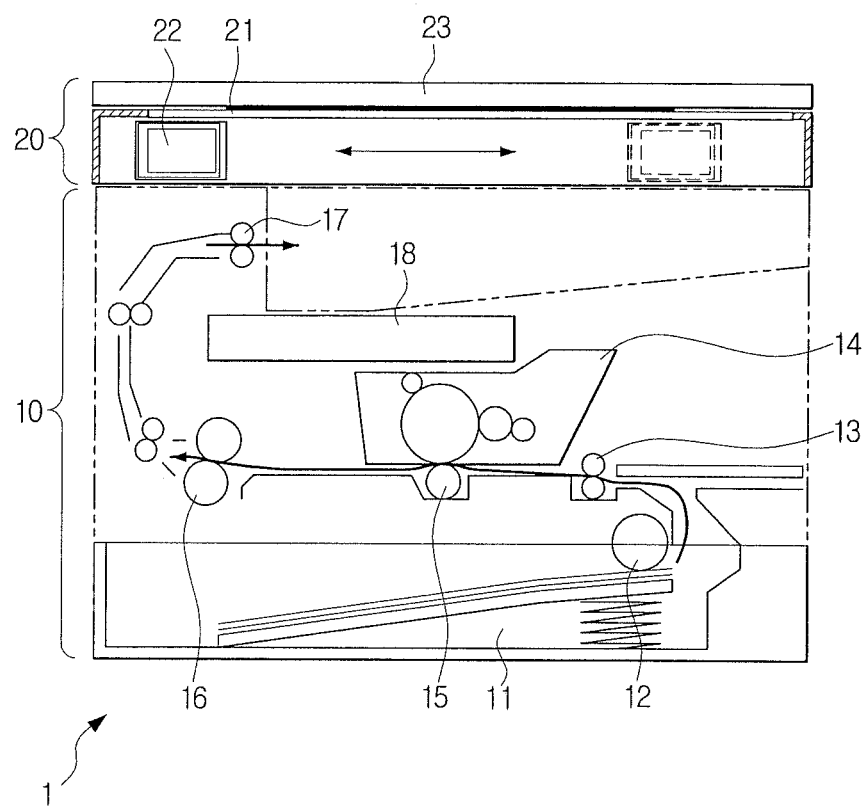
FIG. 1 is a schematic view of a conventional multifunction peripheral (MFC)

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
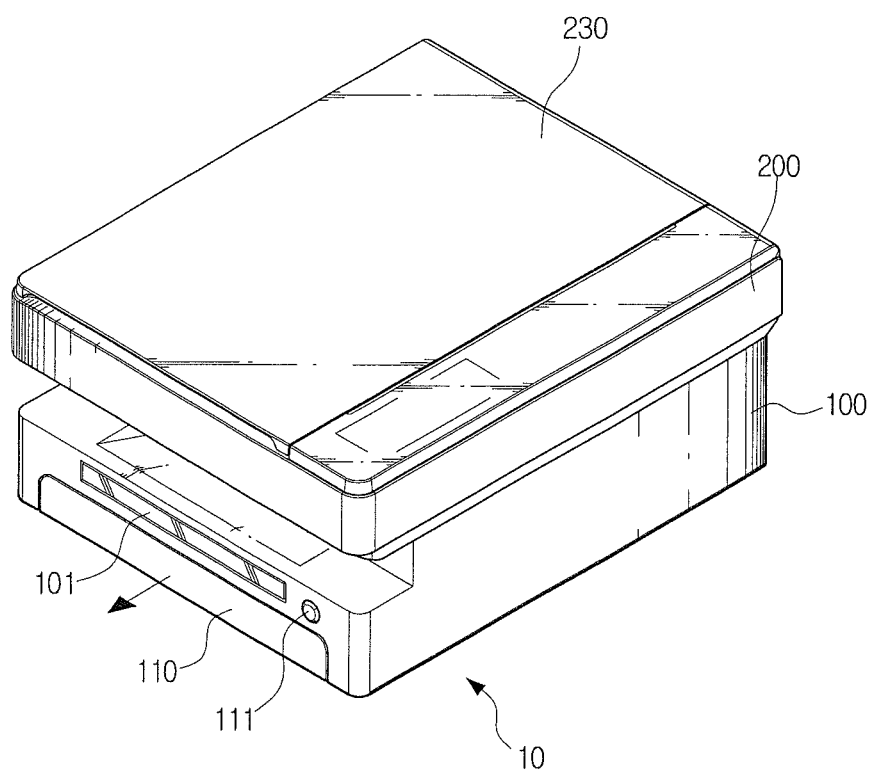
FIG. 2 is a perspective view of an image forming apparatus according to an embodiment of the present invention.
Figure 3:
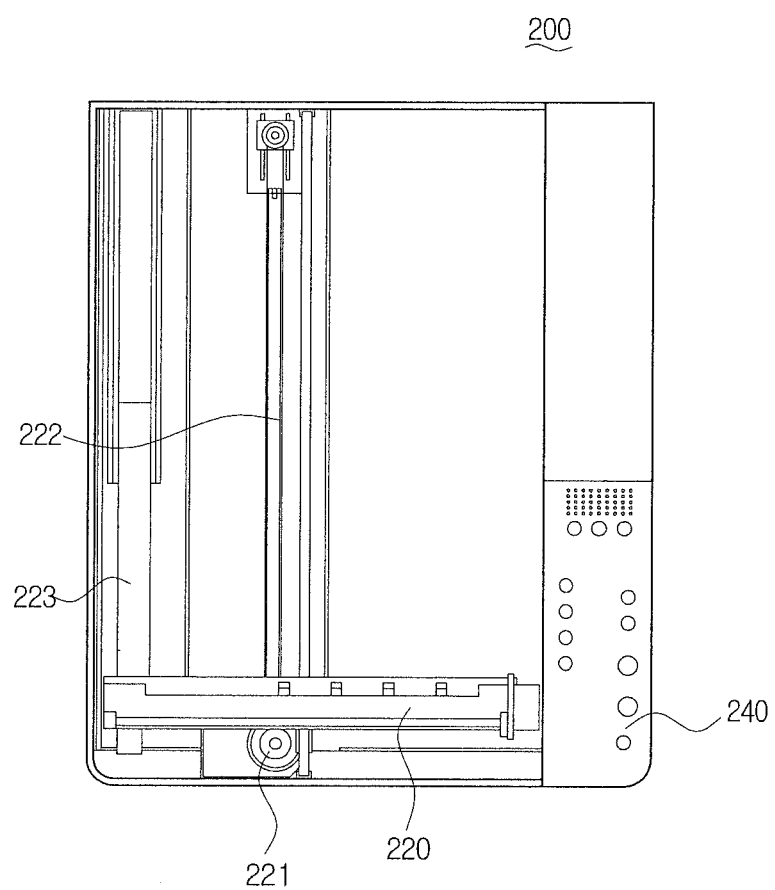
FIG. 3 is a plane view of a second body of the image forming apparatus shown in FIG. 2.
Figure 4:
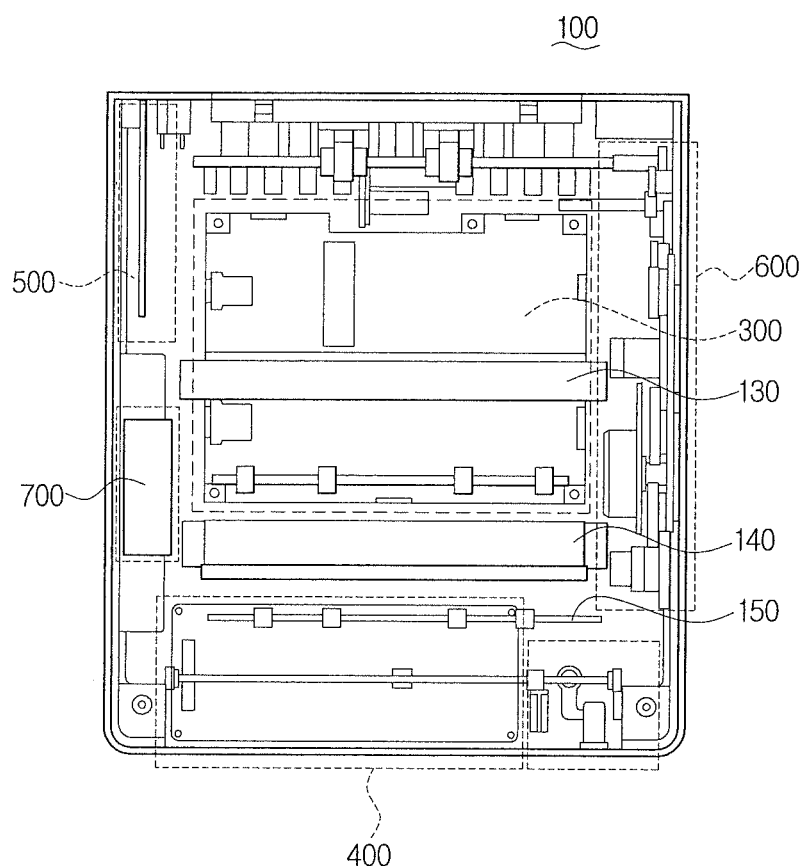
FIG. 4 is a plane view of a first body of the image forming apparatus shown in FIG. 2.
Figure 5:
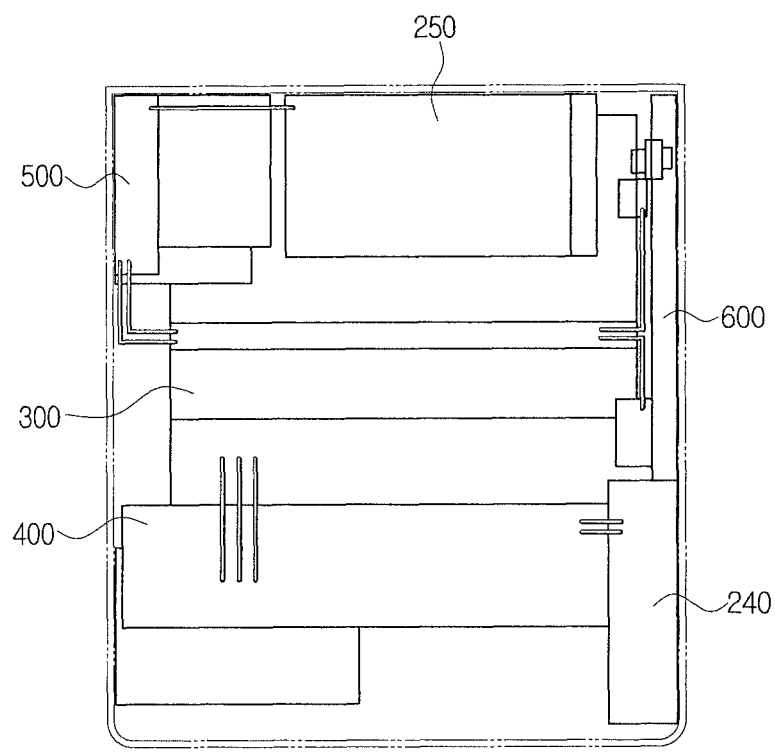
FIG. 5 is a schematic view of the arrangement of a control unit of the first body of the image forming apparatus shown in FIG. 2.

FIG. 2 is a perspective view of an image forming apparatus 10 according to an embodiment of the present invention. FIGS. 3 and 4 are respective plane views of a second body 200 and a first body 100 of the image forming apparatus shown in FIG. 2. FIG. 5 is a schematic view of the arrangement of a control unit 235 included in the image forming apparatus 10 shown in FIG. 2.

As shown in FIGS. 2, 3, 4, and 5, the image forming apparatus 10 includes a first body 100, a second body 200, and first and second power supply units 300 and 400. The first body 100 includes a printing unit mounted therein. The printing unit includes various image forming units, including a feeding unit 110, a developing unit 120, a transferring unit 130, a fixing unit 140 and a discharging unit 150.

As shown in FIG. 2, the feeding unit 110 is mounted on the first body 100 so as to slide open when a button 111 is pressed, and holds a plurality of sheets of printing media, such as, for example, A4, 8.5×11, and letter size paper. According to an aspect of the present invention, the feeding unit 110 holds around 100 sheets of printing media. However, it is understood the feeding unit 110 is not limited to holding 100 sheets of printing media, and may instead be designed to hold more than 100 sheets of printing media.

The developing unit 120 is detachably mounted on the first body 100 and forms a visual image on a surface of the picked up printing medium while rotating in close contact with the transferring unit 130 fixed on the first body 100. According to an aspect of the present invention, a photosensitive medium 121 mounted in the developing unit 120 has a diameter of approximately 20 mm in order to miniaturize the image forming apparatus 10. However, it is understood that the photosensitive medium 121 may have a diameter of 21 mm or less.

The fixing unit 140 applies heat and pressure to the printing medium passing through the developing unit 120 and the transferring unit 130 to fix the visual image on the surface of the printing medium. The fixing unit 140 is securely fastened to sides of the first body 100 by fastening devices, such as, for example, screws, bolts, etc.

The discharging unit 150 includes a plurality of roller units 151 disposed at positions adjacent to the fixing unit 140, and discharges sheets of the printing media passing through the fixing unit 140 towards the front portion of the first body, 100. In the front portion of the first body 100, which is located at the bottom of the feeding unit 110 shown in FIG. 4, the feeding unit 110 is slidably detachable and the printed sheet may be discharged, as shown in FIG. 2. According to an aspect of the present invention, the front portion of the second body 200 has the same dimensions as the front portion of the first body 100. However, it is understood that the front portion of the second body 200 is not required to have the same dimensions as the front portion of the first body 100, and instead may be shaped differently.

Figure 6:
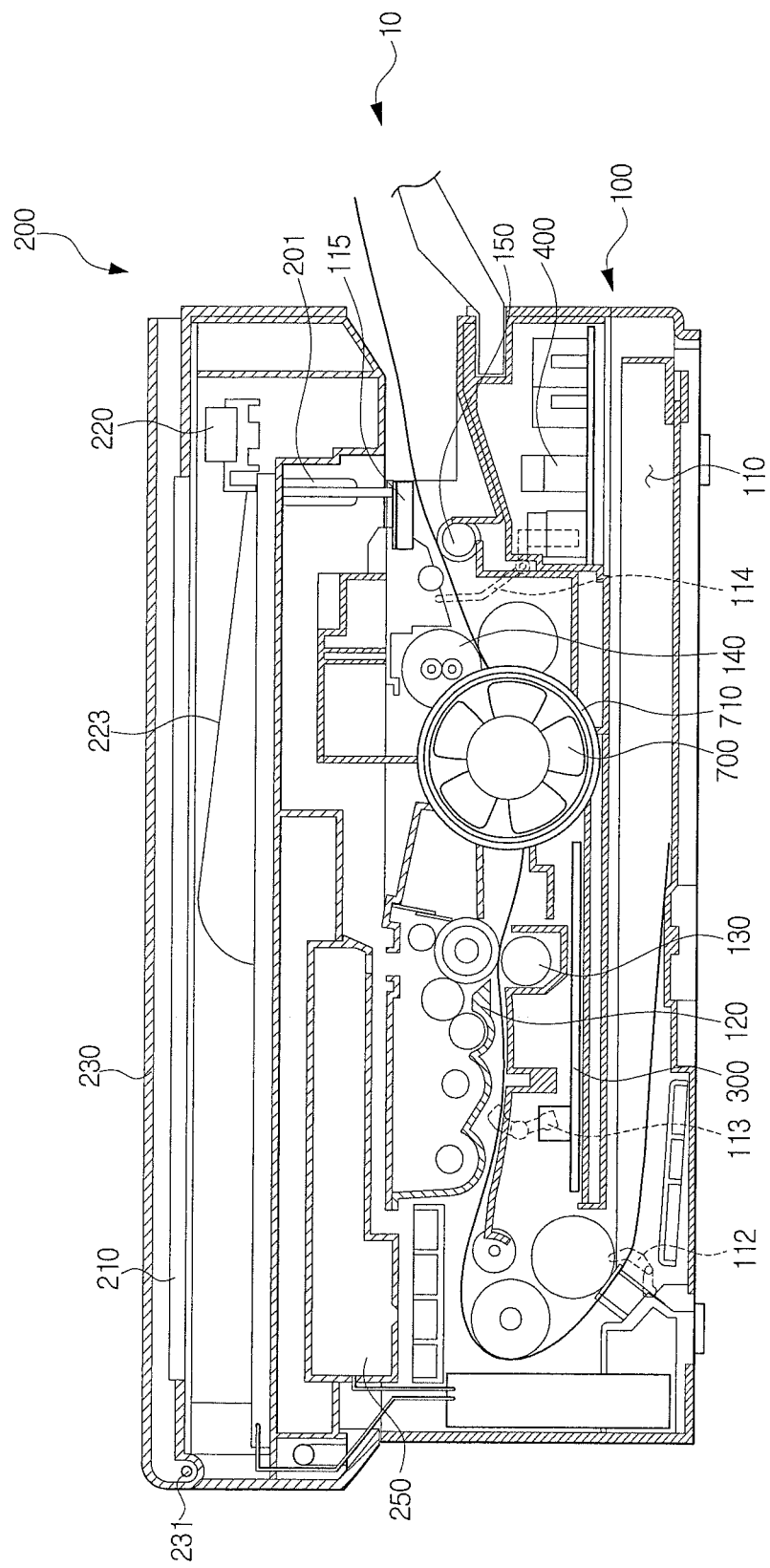
FIGS. 6 and 7 are side views of the image forming apparatus shown in FIG. 2.
Figure 7:
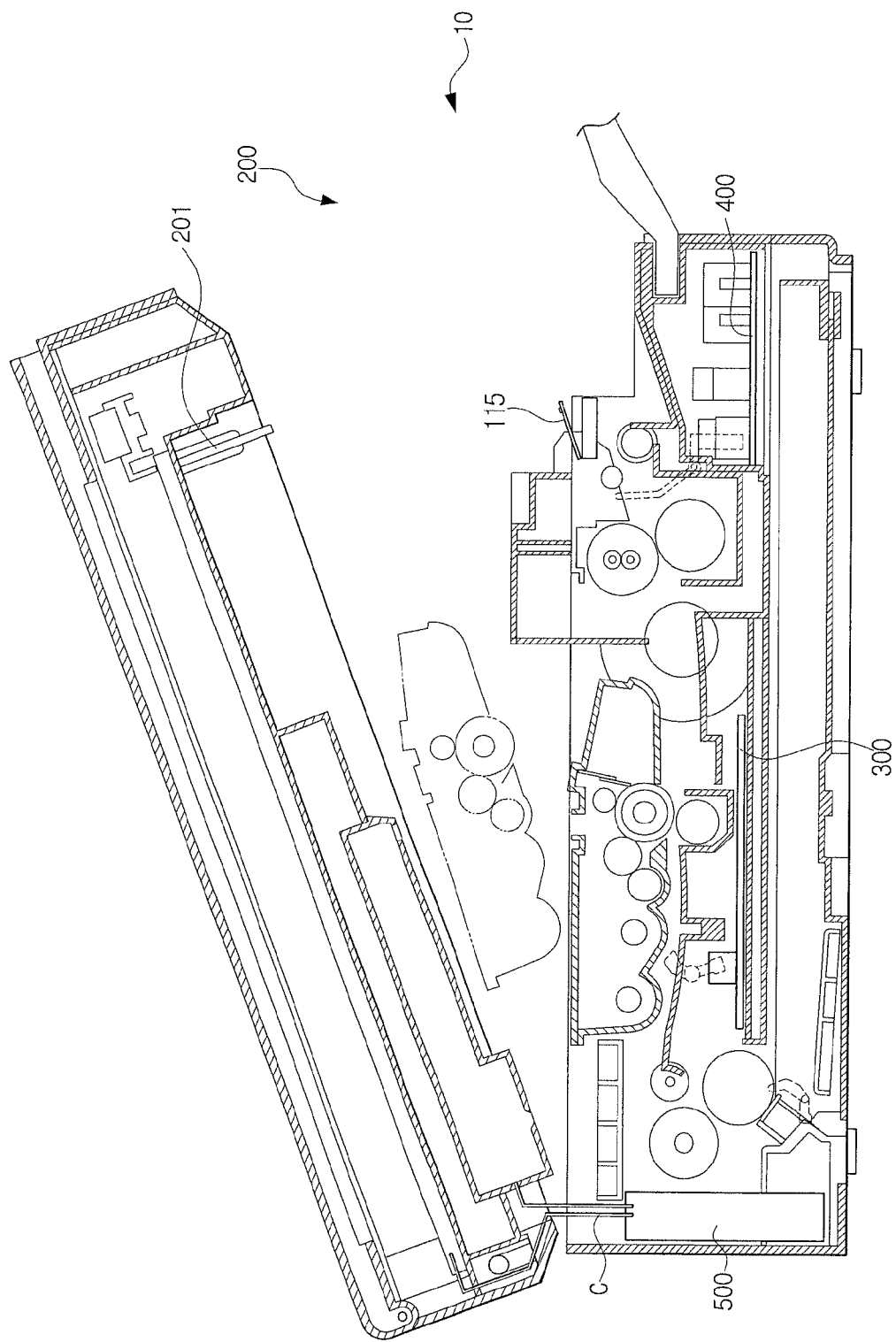

As shown in FIGS. 6 and 7, the developing unit 120, transferring unit 130, fixing unit 140 and discharging unit 150 are mounted in order above the feeding unit 110, and form a C-shaped paper feeding path in the direction in which the printing medium travels after being discharged toward the front portion of the first body 100. Accordingly, the direction in which the feeding unit 110 slides open is the same as the direction in which the printing medium is discharged by the discharging unit 140. According to the configuration described above, it is possible to reduce the height of the image forming apparatus by removing unnecessary space in the interior of the first body 100. It is understood that the feeding unit 110 is not limited to sliding open in the same direction as the direction in which the printing medium is discharged, and may instead be opened in other directions, such as an opposite direction of the direction in which the printing medium is discharged, or off to a side.

The first body 100 includes a pickup sensor 112 to detect the position of the printing media stacked in the feeding unit 110, a registration sensor 113, a discharge sensor 114, and a detection sensor 115 to detect whether the second body 200 is opened or closed. The detection sensor 115 includes, for example, a micro switch which is turned on or off by a pressing boss 201 protruding from a position corresponding to the second body 200 in order to physically cut off the power source of the fixing unit 140 when widening a, gap between the first and second bodies 100 and 200 for the purpose of user safety. An illustration of the detection sensor 115 being switched from on to off by the pressing boss 201 is shown in FIGS. 6 and 7. It is understood that devices other than the detection sensor 115 and the pressing boss 201, such as optical devices employing laser beams, etc., may be used to detect whether the second body 200 has been separated from the first body 100.

Referring to FIGS. 3, 6 and 7, the second body 200 includes a scanning unit including a plate 210, a scanning module 220, a plate cover 230, a control panel 240, and a light emitting unit 250 which is disposed to face the developing unit 120 in order to expose an electrostatic latent image on a photosensitive medium 121 (FIG. 6) in the developing unit 120. According to an aspect of the present invention, the second body 200 has the same width as the first body 100, and is pivotally mounted on the first body 100 at one end. However, it is understood that the second body 200 may be wider or narrower than the first body 100.

The plate 210 is made of a transparent material, such as glass, plastic, etc., and documents, such as sheets of paper, transparency sheets, etc., to be scanned are placed thereon. The scanning module 220 is mounted so as to be able to be moved from side to side below the plate 210 by a driving motor 221 and a timing belt 222, and receives a control signal transmitted via a flexible cable 223. The plate cover 230 is pivotally mounted on the second body 200 at a hinge point 231, is opened and closed by pivoting about the hinge point 231, and covers documents placed on the plate 210.

The control panel 240 transmits a control command to a controlling board 500. The control command controls the scanning module 220 to move from side to side for a scanning operation, and also controls the feeding unit 110, developing unit 120 and fixing unit 140 which are mounted in the first body 100 for a printing operation.

The initial position of the scanning module 220 is on a side opposite the hinge point 231 as shown in FIG. 6. As shown in FIGS. 6 and 7, the initial position of the scanning module 220 is in the front portion of the second body 200, and the hinge point 231 is disposed in the rear portion of the second body 200. When the initial position of the scanning module 220 is at the front portion of the second body 200, a document may be placed on the plate 210 at the front portion of the second body 200 and quickly scanned. Accordingly, the hinge point 231 of the cover 230 has a simple configuration, and an angle between the plate 210 and the cover 230 is reduced when the cover 230 covers the upper side of the document. However, it is understood that the initial position of the scanning module 220 is not limited to being at the front portion of the second body 200, and may instead be anywhere along the plate 210. Further, the hinge point 231 may be located in a different position than the rear portion of the second body 200, such as, for example, a side portion of the second body 200.

The light emitting unit 250 is mounted in a lower part of the second body 200. The light emitting unit 250 exposes the photosensitive medium 121 of the developing unit 120 mounted in the first body 100. When the light emitting unit 250 is mounted in a remaining space of the second body 200, the height of the image forming apparatus is less than the height of an apparatus in which the light emitting unit 250 is mounted in the first body 100.

The light emitting unit 250 is turned on or off by circuitry, such as a switch, which turns the light emitting unit 250 on or off according to whether the fixing unit 140 is turned on or off. An additional detection sensor (not shown), similar to the detection sensor 115 which operates in response to the opening of the second body 200, may also be used to turn the light emitting unit 250 on or off. Alternatively, the fixing unit 140 and the light emitting unit 250 may be simultaneously turned on or off when the second body 200 is opened, so if the light emitting unit 250 is turned on or off by circuitry which automatically turns the light emitting unit 250 on or off according to whether the fixing unit 140 is turned on or off, the number of components is fewer than in an apparatus using a plurality of detection sensors.

According to an aspect of the present invention, a maximum opening angle between the second body 200 and the first body 100 is approximately in a range of 40° to 80°, and is preferably approximately 45°. When the maximum opening angle is too small, a user may have problems when removing jammed paper, and when the opening angle is too large, the hinge point 231 which pivotally connects the first and second bodies 100 and 200 may break due to the weight of the second body 200.

According to an aspect of the present invention, the first power supply unit 300 is a switching mode power supply (SMPS) mounted below the developing unit 120, and the second power supply unit 400 is a high voltage power supply (HVPS) mounted below the fixing unit 140. The first and second power supply units 300 and 400 are connected so that signals can be exchanged with each other. The connection structure is described in greater detail below.

As shown in FIG. 5, the controlling board 500 is mounted on a side wall of the first body 100, and a power transmission unit 600 is mounted on an opposite wall of the first body 100. The controlling board 500 is connected to and controls the printing unit and the scanning unit, which are mounted in the first and second bodies 100 and 200, respectively, and the first and second power supply units 300 and 400. Thus, signals may be exchanged between the controlling board 500 and the power transmission unit 600 through the wire pattern formed on the first and second power supply units 300 and 400. The controlling board 500 is connected to the light emitting unit 250 via a cable C.

Specifically, the controlling board 500 is connected to the first power supply unit 300, the first power supply unit 300 is connected to the second power supply unit 400 so that signals can be transferred, and the second power supply unit 400 is connected to the power transmission unit 600. Accordingly, the controlling board 500 controls the power transmission unit 600 using the wire pattern formed on the first and second power supply units 300 and 400, without requiring a separate cable. It is understood that the wire pattern, i.e., the configuration of the wires in the control unit shown in FIG. 5, may be arranged differently, for example, the controlling board 500 may be connected to the second power supply unit 400 instead of the first power supply unit 300.

Additionally, a single fan 700 is mounted in one side of the first body 100. According to an aspect of the present invention, the fan 700 is mounted in the side in which the controlling board 500 is mounted. The fan 700 causes air inside the image forming apparatus to be outwardly discharged, and cools the first and second power supply units 300 and 400 and the fixing unit 140 at the same time. Additionally, a shock absorbing member 710, which is configured to reduce noise and vibration, may be disposed between the fan 700 and the side frame of the first body 100 which the fan 700 is mounted on. The shock absorbing member 710 may be formed out of a sponge-like material, or may be formed out of various other materials which are designed to absorb noise and vibration, such as elastic materials, etc.

An image forming apparatus according to another aspect of the present invention may be implemented without the scanning unit described above. In this situation, the plate 210, scanning module 220 and plate cover 230 may also be omitted, thus possible greatly lowering the height of the image forming apparatus. In the image forming apparatus according to another embodiment, the first body 100 has the same configuration as is described in detail above, so a detailed description thereof is omitted. Additionally, aspects of the present invention are not limited to printing units and scanning units, and may also be applied to various other types of image forming apparatuses. For example, the first body 100 as described in detail above may be combined with a facsimile, a copier, a multi-function apparatus, etc., and still have a reduced height compared to a conventional image forming apparatus.

Hereinafter, an operation of the image forming apparatus 10 will be described. The image forming apparatus 10 includes a first body 100 in which a printing unit is mounted, and a second body 200 in which a scanning module 220 is mounted. The second body 200 is pivotally opened and closed from the first body 100 at the hinge point 231. The image forming apparatus 10 is operated in the same manner as the conventional MFP is operated, so a detailed description thereof is omitted.

In order to reduce the height of the first body 100, a C-shaped printing medium feeding path is formed to change a paper feeding direction once. The developing unit 120, the transferring unit 130, the fixing unit 140 and the discharging unit 150 are arranged in order above the feeding unit 110.

A first power supply unit 300 supplies power to the developing unit 120. The first power supply unit 300 is disposed below the developing unit 120. A second power supply unit 400 supplies power to the fixing unit 140. The second power supply unit 400 is disposed below the fixing unit 140. According to this configuration, it is possible to supply power through wires of minimum length.

A power transmission unit 600 transmits power to the feeding unit 110, developing unit 120, transferring unit 130, fixing unit 140 and discharging unit 150. The power transmission unit 600 is controlled by a controlling board 500. Signals are exchanged between the controlling board 500 and the power transmission unit 600 through the wire pattern formed on the first and second power supply units 300 and 400. Accordingly, there is no need for a separate cable for signal transmission, so material costs are thereby reduced and the problem of electromagnetic radiation emitted by extra cables is ameliorated.

Various components mounted in the first body 100, such as the fixing unit 140 and the first and second power supply units 300 and 400, are disposed sufficiently close to each other in a compact fashion so that a fan 700 which reduces heat emitted by the components can be shared between the different components. Accordingly, as shown in FIGS. 6 and 7, the fan 700 is mounted so as to overlap or nearly overlap with other components, in order to simultaneously reduce heat emitted by the fixing unit 140 and heat emitted by the first and second power supply units 300 and 400. Additionally, a shock absorbing member 710, such as a sponge-like material, may be interposed between the fan 700 and a side frame of the first body 100 which the fan 700 is mounted on to reduce noise and vibration caused by a rotation of the fan 710. Air discharged through the fan 700 is discharged through a discharge grill disposed in the first body 100. In order to prevent internal noise from being heard outside the image forming apparatus 10, air is drawn inwardly through a gap between the first and second bodies 100 and 200, without needing to form a separate grill for air suction.

According to the configuration described above, the image forming apparatus 10 is configured in such a manner as to minimize interference between each component, and is also compact enough to be directly mounted on a desktop or other relatively small surface. Therefore, it is not necessary for a user to travel to a location in which the image forming apparatus 10 is placed, such as a far end of an office hallway, in order to perform copying, scanning and printing.

Furthermore, when paper jamming occurs during printing or copying, or if maintenance of the developing unit 120 or the fixing unit 140 is needed, the image forming apparatus 10 according to aspects of the present invention enables the user to pivotally rotate the second body 200 about the hinge point 231 so that the developing unit 120 and fixing unit 140 are exposed, as shown in FIG. 7. In this manner, a user may efficiently fix paper jams, change the developing unit 120 or fixing unit 140, and perform various other types of repairs to the image forming apparatus 10.

According to an aspect of the present invention, the first body 100 has a height and a weight greater than the second body 200, thereby preventing the image forming apparatus 10 from flipping due to inertia during rotation of the second body 200 about the hinge point 231. However, it is understood that the first body 100 is not required to be heavier and taller than the second body 200, and may instead be configured in other ways to prevent flipping, for example, the first body 100 may be attached to a desktop surface using fasteners.

Additionally, the opening angle between the first and second bodies 100 and 200 is approximately 45°. Accordingly, a user can easily reach into a gap between the first and second bodies 100 and 200 to change the developing unit 120 or to remove jammed paper. In addition, the 45° maximum opening angle prevents the second body 200 or the hinge connecting the first and second bodies 100 and 200 from being broken due to an excessive opening of the second body 200 at an excessively large angle.

The image forming apparatus 10 according to aspects of the present invention described above can be placed on a desktop or some other relatively small surface, and accordingly, a user can more conveniently operate the image forming apparatus 10. Additionally, the image forming apparatus 10 is especially useful for a user who primarily wants to print or copy printing media in small quantities.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus, comprising:
a first body;
an image forming unit disposed in the first body so as to form a C-shaped printing medium feeding path;
a first power supply unit and a second power supply unit disposed in the first body to supply power to the image forming unit;
a controlling board disposed adjacent to a first side wall of the first body to control the image forming unit, the first power supply unit, and the second power supply unit; and
a power transmission unit disposed adjacent to a second side wall of the first body, opposite of the controlling board.

2. The apparatus according to claim 1, further comprising a paper cassette to hold a plurality of sheets of printing media, the paper cassette mounted in the first body adjacent to a bottom surface of the first body;
wherein the first power supply unit and second power supply unit are disposed between the image forming unit and the paper cassette.

3. The apparatus according to claim 2, wherein the image forming unit disposed in the first body comprises a developing unit, a transferring unit, a fixing unit and a discharging unit, the first power supply unit is disposed below the developing unit, and the second power supply unit is disposed below at least one of the fixing unit and the discharging unit.

4. The apparatus according to claim 1, wherein the first power supply unit comprises a first printed circuit board for performing a switching mode power supply (SMPS), and the second power supply unit comprises a second printed circuit board for performing a high voltage power supply (HVPS).

5. The apparatus according to claim 1, further comprising:
a second body pivotally mounted above the first body; and
a light emitting unit disposed in the second body, wherein the first power supply unit or second power supply unit also supplies the power to the light emitting unit.

6. The apparatus according to claim 1, wherein the controlling board is directly connected to the first power supply unit, the first power supply unit is directly connected to the second power supply unit, and the second power supply unit is directly connected to the power transmission unit.

7. The apparatus according to claim 5, wherein the first body comprises a detection sensor to detect whether the second body is opened or closed.

8. The apparatus according to claim 7, wherein, if the detection sensor detects that the second body is opened, the detection sensor turns off the fixing unit.

9. The apparatus according to claim 8, wherein if the fixing unit is turned off, the light emitting unit is turned off.

10. The apparatus according to claim 1, wherein a fan is mounted on the first side wall of the first body.

11. The apparatus according to claim 10, wherein the fan simultaneously cools the first power supply unit, the second power supply unit, and the fixing unit.

12. The apparatus according to claim 10, wherein the fan outwardly discharges air inside the image forming apparatus.

13. The apparatus according to claim 10, further comprising a shock absorbing member disposed between the fan and the first side wall to reduce noise and vibration between the fan and the first side wall.

14. The apparatus according to claim 13, wherein the shock absorbing member is a sponge.

15. The apparatus according to claim 1, wherein the first power supply unit is connected to the controlling board, the second power supply unit is connected to the power transmission unit, and the first power supply unit and the second power supply unit are connected to each other to exchange signals with each other.

16. The apparatus according to claim 1, further comprising a second body, wherein the second body comprises a scanning unit.

17. The apparatus according to claim 1, further comprising a second body, wherein the second body has the same width as the first body.

18. The apparatus according to claim 2, wherein the paper cassette is slidably mounted in a bottom portion of the first body.

19. The apparatus according to claim 1, wherein the controlling board, the first power supply unit, and the second power supply unit are sequentially connected using a wire pattern.

* * * * *